United States Patent

Herd et al.

[11] Patent Number: 5,166,325
[45] Date of Patent: Nov. 24, 1992

[54] POLYAZO REACTIVE DYESTUFFS CONTAINING THE 4-FLUORO-5-CHLOROPYRIMIDIN-6-YL FIBER REACTIVE RADICAL AND THE USE THEREOF TO DYE OR PRINT HYDROXYL-OR AMINO-CONTAINING MATERIAL

[75] Inventors: Karl-Josef Herd, Odenthal-Holz; Hermann Henk, Cologne; Karl-Heinz Schündehütte, Leverkusen; Frank-Michael Stöhr, Odenthal-Osenau, all of Fed. Rep. of Germany

[73] Assignee: Bayer Aktiengesellschaft, Leverkusen, Fed. Rep. of Germany

[21] Appl. No.: 691,274

[22] Filed: Apr. 25, 1991

[30] Foreign Application Priority Data

May 1, 1990 [DE] Fed. Rep. of Germany ....... 4013986

[51] Int. Cl.$^5$ .................... C09B 62/25; C09B 62/513; D06P 1/382
[52] U.S. Cl. .................... 534/637; 534/598; 8/549
[58] Field of Search ........................ 534/637

[56] References Cited

U.S. PATENT DOCUMENTS

| | | | |
|---|---|---|---|
| 3,910,758 | 10/1975 | Bien et al. | 534/637 X |
| 4,049,704 | 9/1977 | Jager | 534/637 X |
| 4,638,054 | 1/1987 | Herd et al. | 534/637 |
| 4,996,304 | 2/1991 | Trikas | 534/637 |

Primary Examiner—Mary C. Lee
Assistant Examiner—Fiona T. Powers
Attorney, Agent, or Firm—Sprung, Horn, Kramer & Woods

[57] ABSTRACT

The new polyazo reactive dyestuffs of the formula

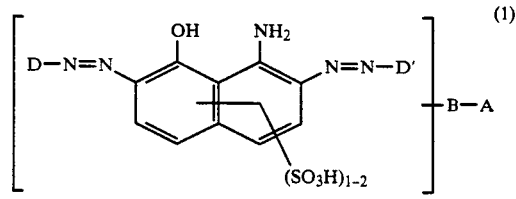

in which the substituents have the meaning given in the description are highly suitable for the dyeing or printing of hydroxyl- or amido-containing materials. The dyeings and prints obtained are distinguished by high fibre-dyestuff bonding stability and by particularly good stability to oxidizing agents.

7 Claims, No Drawings

POLYAZO REACTIVE DYESTUFFS CONTAINING THE 4-FLUORO-5-CHLOROPYRIMIDIN-6-YL FIBER REACTIVE RADICAL AND THE USE THEREOF TO DYE OR PRINT HYDROXYL- OR AMINO-CONTAINING MATERIAL

The present invention relates to new polyazo reactive dyestuffs of the formula

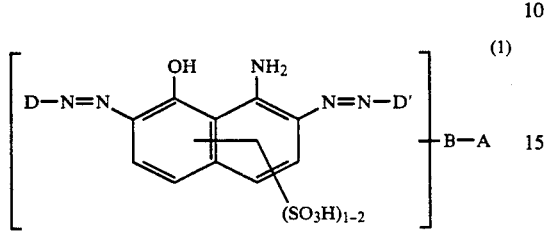

in which

A represents the radical of the formula

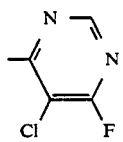

B represents a bridging member, in which the grouping —B—A is linked to a carbon atom of an aromatic or heteroaromatic ring system in D or D', and D and D' represent the radical of a diazo component from the benzene, naphthalene or hetaryl series, with the exception of the dyestuff of the formula

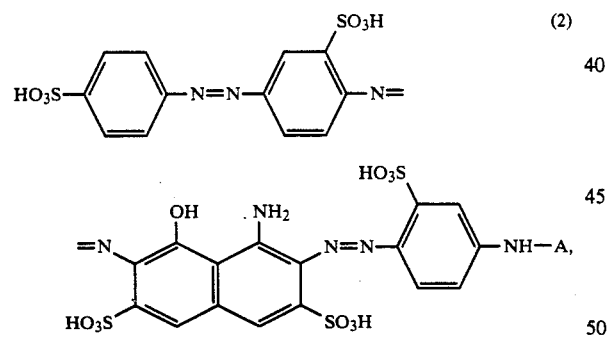

and to processes for their preparation and their use for the dyeing and printing of hydroxyl- or amido-containing materials.

The radicals D and D' can be identical or different and can each have further substituents, such as, for example, $C_1$-$C_4$-alkyl, $C_1$-$C_4$-alkoxy, amino, hydroxyl, halogen, acylamino, carboxyl, $C_1$-$C_4$-alkoxycarbonyl, carboxamido, $C_1$-$C_4$-alkylsulphonyl, benzoylamino, phenylsulphonyl, β-hydroxysulphonyl, β-sulphatoethylsulphonyl, β-chloroethylsulphonyl, vinylsulphonyl, (methylsulphonyl)amino, phenylazo, sulphophenylazo, disulphophenylazo, carboxyphenylazo and (β-sulphatoethylsulphonyl)phenylazo, benzothiazol-2-yl or naphtho[1,2-d]triazol-2-yl, preferably sulpho groups.

B preferably represents —$(CH_2)_{0-1}$—NR— or —$SO_2$—$CH_2CH_2$—NR—, in which the bond to A is in each case via the nitrogen atom, and R represents hydrogen or unsubstituted or hydroxyl-, chlorine-, carboxyl-, sulpho- or sulphato-substituted $C_1$-$C_4$-alkyl.

Preference is given to the trisazo reactive dyestuffs of the formulae

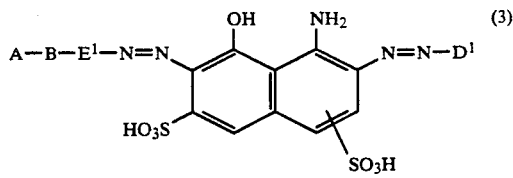

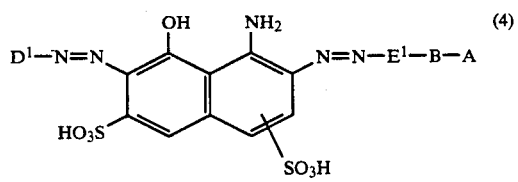

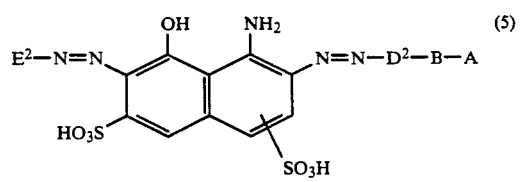

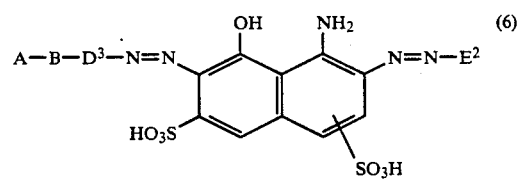

in which

—B—$E^1$— represents

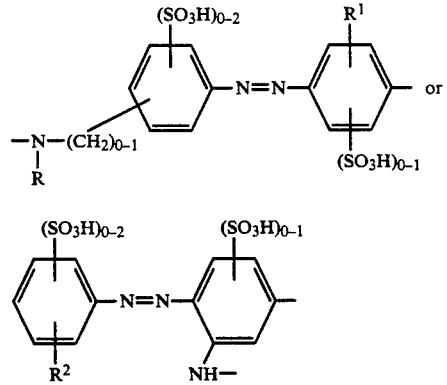

$D^1$ represents

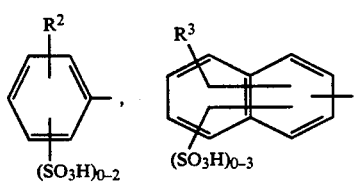

-continued

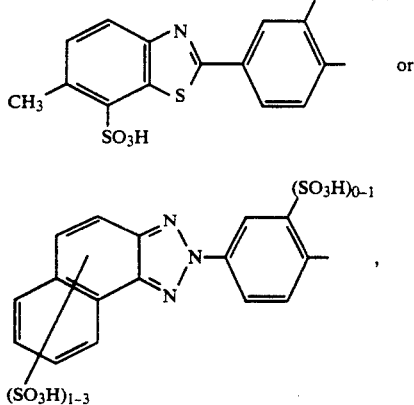

$E^2$ represents

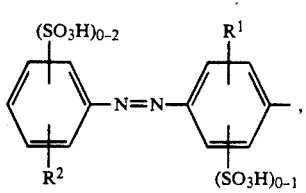

—B—D²— represents

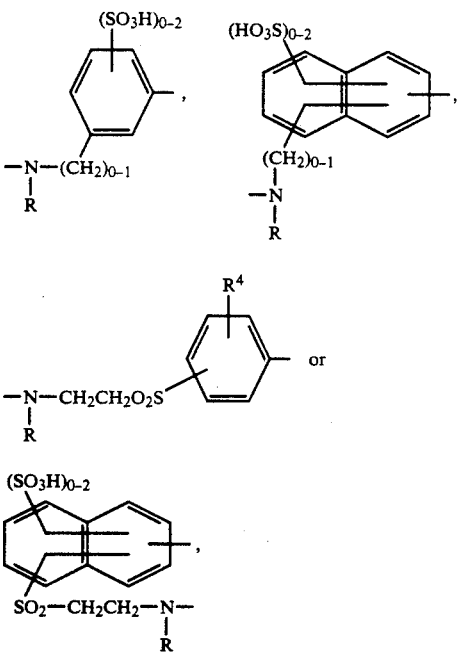

and —B—D³— represents
—B—D²— or

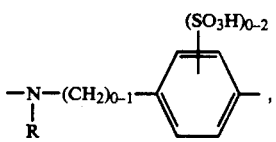

in which $R^1$ represents H, $CH_3$, —$C_2H_5$, —$OCH_3$, —$OC_2H_5$, Cl, Br, —$NHCOCH_3$ or —$NHCONH_2$ and $R^2$ represents H, $CH_3$, —$C_2H_5$, —$OCH_3$, —$OC_2H_5$, Cl, Br, —$CO_2H$, —$NHCOCH_3$, —$SO_2CH=CH_2$, —$SO_2CH_2CH_2OSO_3H$ or —$SO_2CH_2CH_2Cl$, $R^3$ represents H, Cl, —$OCH_3$, —$OC_2H_5$, —$SO_2CH=CH_2$, —$CO_2H$, —$SO_2CH_2CH_2Cl$ or —$SO_2CH_2CH_2OSO_3H$ and $R^4$ represents H, $CH_3$, Cl, Br, —COOH, —$SO_3H$ or —$OCH_3$, and A and R have the abovementioned meaning.

Particular preference is given to those dyestuffs of the formulae

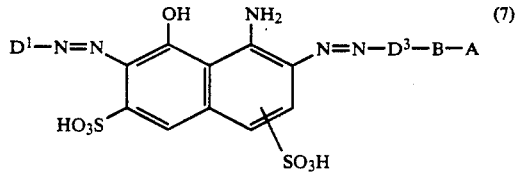

and

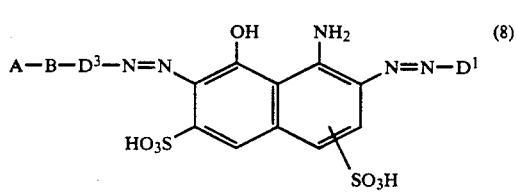

in which $D^1$ and —B—$D^3$ have the abovementioned meaning.

Of these, the following dyestuffs may be mentioned in particular:

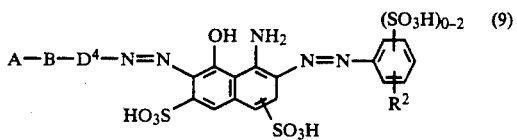

in which

B—$D^4$— represents

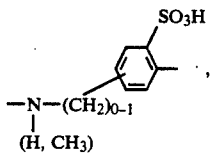

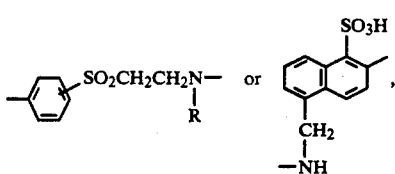

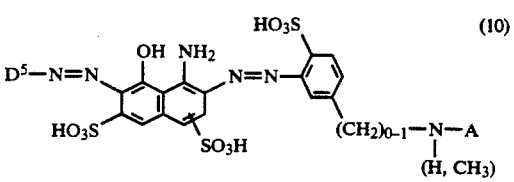

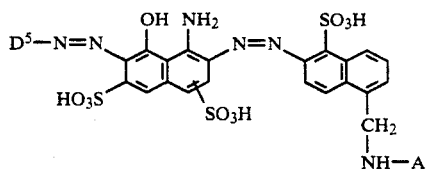
(11)

in which $D^5$ represents

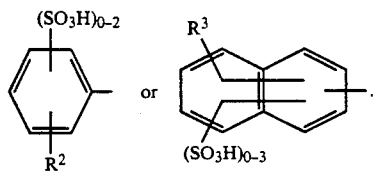

The dyestuffs of the formula (1) can be prepared by various methods:

a) Polyazo chromophores of the formula

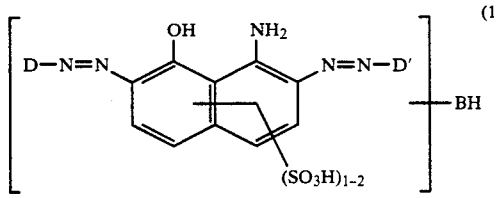
(12)

in which

B contains a terminal, acylatable amino group and

D and D' have the abovementioned meaning, are condensed with 5-chloro-4,6-difluoropyrimidine in the presence of acid-binding agents, such as, for example, alkali metal hydroxide or alkali metal carbonate.

b) A diazo component of the formula

A—B—D—NH$_2$ (13)

in which

A, B and D have the abovementioned meaning, is diazotised and the resulting diazonium salt is coupled onto a coupling component of the formula

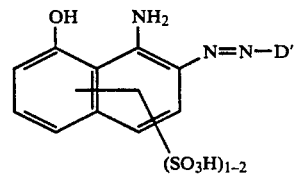
(14)

in which

D' has the abovementioned meaning.

c) A diazo component of the formula

D—NH$_2$ (15)

in which

D has the abovementioned is diazotised and the diazonium salt is coupled onto a coupling component of the formula

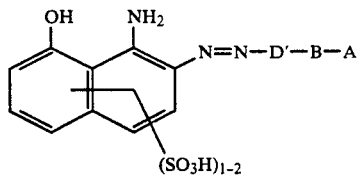
(16)

in which

D', B and A have the abovementioned meaning.

Compound (16) is obtained by diazotising amino compounds of the formula

A—B—D'—NH$_2$ (17)

in which

A, B and D' have the abovementioned meaning, and the product is coupled onto 1-amino-8-hydroxynaphthalene di- or monosulphonic acids, or by condensing compounds of the formula

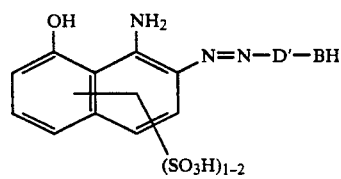
(18)

in which

B is a terminal, acylatable amino group and

D' has the abovementioned meaning, with 5-chloro-4,6-difluoropyrimidine.

The new dyestuffs are suitable for the dyeing and printing of hydroxy-. and amino-containing materials, in particular cellulose materials. They are distinguished by high reactivity and a good degree of fixation. The dyeings and prints on cellulose materials obtainable with these dyestuffs are also distinguished by a high fibre-dyestuff bonding stability and by excellent stability to oxidizing agents, such as peroxide- or chlorine-containing detergents.

The hydrolysis products which are formed during dyeing or printing only to a small extent can be easily washed off. The dyestuffs have good wet fastness properties.

The formulae given are those of the free acids. The preparation in general gives the salts, in particular the alkali metal salts, such as sodium salts, potassium salts or lithium salts.

The dyestuffs can be used either as solid formulations or as concentrated solutions.

EXAMPLE 1

A) 49.2 g of the compound of the formula

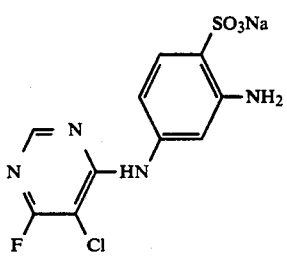

which had been prepared by condensing 2,4-diaminobenzenesulphonic acid with 5-chloro-4,6-difluoropyrimidine, were suspended in 300 ml of water and 40 ml of concentrated hydrochloric acid at 0° C. A solution of 10.5 g of sodium nitrite in 30 ml of water was added dropwise over a period of 15 minutes. The temperature was maintained in the range from 0°-4° C. by adding ice. After another 30 minutes of stirring, the diazotisation was complete, giving a light yellow suspension. Excess nitrite was destroyed with sulphamic acid solution.

This suspension was metered into a solution of 82.5 g of the monoazo compound of the formula

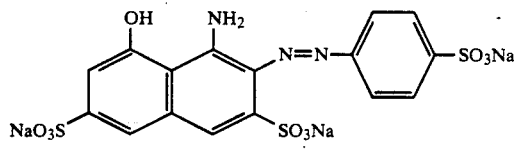

in 500 ml of water at a pH of 7 over a period of 15-20 minutes, during which the pH was kept between 6 and 8 by adding 20% strength sodium carbonate solution. To complete the coupling reaction, the mixture was stirred at a pH of 7-8 for 1 hour, and the dyestuff was then salted out by adding 70 g of common salt. Isolation and drying gave about 150 g of a salt-containing black dyestuff powder which has the structure

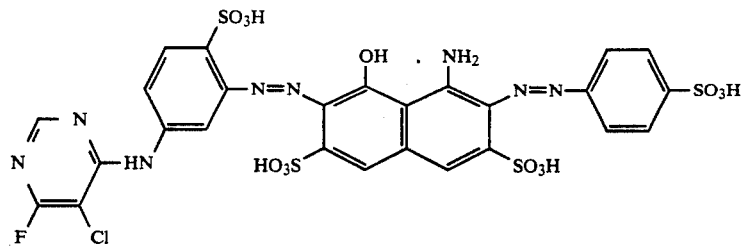

($\lambda_{max}$=598 nm (H$_2$O)) and dyes cotton by the dyeing or printing processes customary for reactive dyestuffs in navy to black hues.

B) The reactive dyestuff described under A) could also be prepared by condensing a solution of 133.4 g of the diazo colour base of the formula

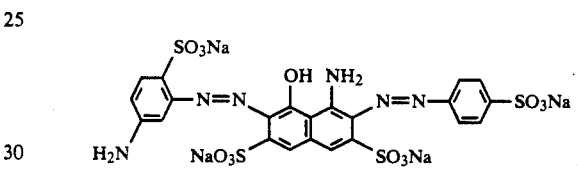

in 750 ml of water at 50° C. and a constant pH of 7-8 (addition of sodium carbonate solution) with 24 g of 5-chloro-4,6-difluoropyrimidine and isolating the dyestuff at 20°-25° C. as described under A).

Further valuable reactive dyestuffs were obtained by varying the diazo components in analogy to Example 1 as follows:

TABLE 1

| Example | A—B—D— | D'— | Hue |
|---|---|---|---|
| 2 | A—HN—⌬—SO$_3$H | HO$_3$S—⌬—SO$_3$H | navy/black (610 nm) |
| 3 | " | —⌬—SO$_2$CH$_2$CH$_2$OSO$_3$H | navy/black (604 nm) |
| 4 | " | —⌬—SO$_2$NH$_2$ | navy (602 nm) |

TABLE 1-continued

Structure: A—B—D—N=N— attached to a naphthalene with OH, NH₂, HO₃S, SO₃H substituents, with —N=N—D' on the other side.

$A = $ 5-chloro-6-fluoropyrimidin-4-yl

| Example | A—B—D— | D'— | Hue |
|---|---|---|---|
| 5 | " | 3-sulfo-phenyl-(6-methyl-7-sulfo-benzothiazol-2-yl) | greenish blue |
| 6 | 4-(A—NH)-2-methyl-phenyl-SO₃H | 2,5-disulfo-4-methylphenyl | navy (611 nm) |
| 7 | " | 2-methyl-4-sulfo-phenyl | navy/black (600 nm) |
| 8 | " | 4-CO₂H-phenyl | navy |
| 9 | " | 3-(SO₂CH₂CH₂OSO₃H)-phenyl | navy (602 nm) |
| 10 | " | 2-methyl-(SO₂CH₂CH₂OSO₃H)-phenyl | navy (605 nm) |
| 11 | " | 2-methyl-1-sulfo-6-(SO₂CH₂CH₂OSO₃H)-naphthyl | greenish black |
| 12 | 4-(A—NH)-2-methyl-phenyl-SO₃H | 7-methyl-1,3-disulfo-naphthyl | greenish black |
| 13 | " | 4-methyl-3-sulfo-phenyl-N=N-4-sulfophenyl | dark green |

TABLE 1-continued

Structure:
A—B—D—N=N— attached to naphthalene bearing OH, NH₂, two SO₃H groups, with —N=N—D' on the other side.

A = 5-chloro-6-fluoropyrimidin-4-yl

| Example | A—B—D— | D'— | Hue |
|---|---|---|---|
| 14 | " | 4-[(2,5-disulfophenyl)azo]phenyl— (HO₃S and SO₃H on the second ring) | " |
| 15 | A—HN—(3-sulfo-4-methylphenyl)— | 4-sulfophenyl— | greenish dark blue |
| 16 | " | 4-(SO₂CH₂CH₂OSO₃H)phenyl— | " |
| 17 | " | 2-methyl-4-sulfo-(HO₃S)phenyl— | " |
| 18 | A—HN—(3-sulfo-4-methylphenyl)— | 7-methyl-1,5-disulfonaphthalen-yl— | greenish dark blue |
| 19 | 4-sulfo-3-[CH₂—N(CH₃)—A]phenyl— | 4-sulfophenyl— | reddish navy |
| 20 | " | 3-sulfophenyl— | " |
| 21 | " | 4-(SO₂CH₂CH₂OSO₃H)phenyl— | navy/black |

TABLE 1-continued

Structure:

A—B—D—N=N— attached to a naphthalene core bearing OH and NH₂ (peri), with HO₃S and SO₃H groups, and —N=N—D' on the other side.

$$A = \text{5-chloro-6-fluoropyrimidin-4-yl}$$

| Example | A—B—D— | D'— | Hue |
|---|---|---|---|
| 22 | | 2-methyl-naphthalene-1,5-disulfonic acid residue (SO₃H at 1 and 5, CH₃) | " |
| 23 | 3-methyl-4-sulfo-benzyl-N(CH₃)-A | —C₆H₄—N=N—C₆H₄—SO₃H (4,4'-azo) | greenish black |
| 24 | " | 7-methyl-naphthalene with SO₃H (1) and SO₂CH₂CH₂OSO₃H (3) | " |
| 25 | " | 7-methyl-naphthalene-1,3-disulfonic acid residue | navy |
| 26 | A—N(CH₃)—CH₂CH₂—SO₂—C₆H₄— | —C₆H₄—SO₃H | navy/black |
| 27 | A—N(CH₃)—CH₂CH₂—SO₂—C₆H₄— | —C₆H₄—SO₂CH₂CH₂OSO₃H | navy/black |
| 28 | " | 2-methyl-benzene-1,4-disulfonic acid residue (HO₃S, SO₃H) | " |
| 29 | 2-methyl-5-(CH₂NH—A)-naphthalen-1-yl, SO₃H | —C₆H₄—SO₃H | " |

TABLE 1-continued

Structure: A—B—D—N=N—[naphthalene with OH, NH₂, HO₃S, SO₃H]—N=N—D'

A = [pyrimidine with Cl, F substituents]

| Example | A—B—D— | D'— | Hue |
|---------|--------|-----|-----|
| 30 | " | 2-methylbenzene with HO₃S | " |
| 31 | " | benzene with HO₃S and SO₃H (1,4-positions with methyl) | " |
| 32 | naphthalene with SO₃H, CH₂NH—A | phenyl—SO₂CH₂CH₂OSO₃H | navy/black |
| 33 | " | 2-methylphenyl—SO₂CH₂CH₂OSO₃H | " |
| 34 | " | methylphenyl(HO₃S)—N=N—phenyl—SO₃H | dark green/black |
| 35 | " | naphthalene with two SO₃H and methyl | greenish blue |
| 36 | naphthalene with SO₃H, CH₂NH—A | methylnaphthalene with SO₃H, SO₂CH₂CH₂OSO₃H | greenish black |
| 37 | naphthalene with SO₃H, methyl, O₂S—CH₂CH₂—N(A)—CH₂CH₂SO₃H | phenyl—SO₃H | navy/black |

TABLE 1-continued

General structure:

A—B—D—N=N— [1-amino-8-hydroxy-naphthalene-3,6-disulphonic acid core with OH, NH₂] —N=N—D'

$$A = \text{pyrimidinyl with Cl and F substituents}$$

| Example | A—B—D— | D'— | Hue |
|---|---|---|---|
| 38 | " | phenyl-SO₃H (meta) | " |
| 39 | " | phenyl-SO₂CH₂CH₂OSO₃H (para) | " |
| 40 | 2-methyl-6-(N,N-bis(2-sulphoethyl)-A-amino-sulphonyl)naphthalene-1-sulphonyl | 2-HO₃S-5-CH₃-phenyl | navy/black |

(Example 40 D group contains: SO₃H, O₂S—CH₂CH₂—N(A)—CH₂CH₂SO₃H substituents on naphthalene)

EXAMPLES 41 To 80

The dyestuffs of these examples were obtained by using in Example 1 to 40 1-amino-8-hydroxy-4,6-naphthalenedisulphonic acid instead of the coupling component 1-amino-8-hydroxy-3,6-naphthalenedisulphonic acid. The formula of Example 43 is given as an example:

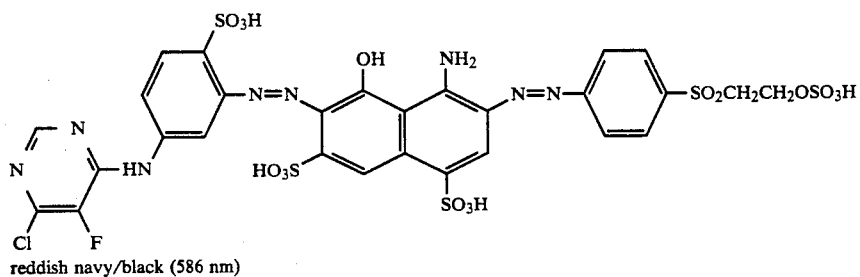

reddish navy/black (586 nm)

EXAMPLE 81

9.2 g of the diazo component from Example 1A) were diazotised at 0°–4° C. as described there.

A solution of 52.6 g of disodium 1-amino-8-hydroxy-3,6-naphthalenedisulphonate in 250 ml of water was then metered into the diazonium salt suspension over a period of 15 minutes. The mixture was stirred at a pH of 1.5–2.5 and a temperature of 5°–10° C. The pH was then raised to 3.5 by slow addition of a 20% strength sodium acetate solution, the mixture was stirred again at this pH and 10°–20° C. for 3 hours. After the coupling was complete, the pH was brought to 7.5 with a 20% strength sodium carbonate solution.

The mixture of a diazonium salt obtained by diazotising 47.1 g of the monosodium salt of 2-amino-1,5-naphthalenedisulphonic acid was added to this red coupling solution over a period of 30 minutes, while maintaining the pH in the range from 6.5–8.0 by adding 20% strength sodium carbonate solution. Stirring at pH 7–8 was continued for 2 hours, and the product was salted out with a sufficient amount of potassium chloride. The precipitated dyestuff was isolated by suction filtration and dried. The black dyestuff powder which has the structure

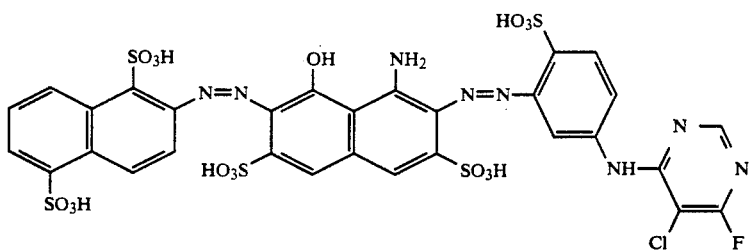

dyes cotton in navy to black hues ($\lambda_{max}$=610 nm).

The reactive dyestuff which is also used preferably in reactive printing could also be prepared by condensing 5-chloro-4,6-difluoropyrimidine with the disazo colour base of the formula By varying the fibre-reactive as well as the non-fibre-reactive diazo component, it was possible to synthesise further interesting reactive dyestuffs in analogy to Example 81:

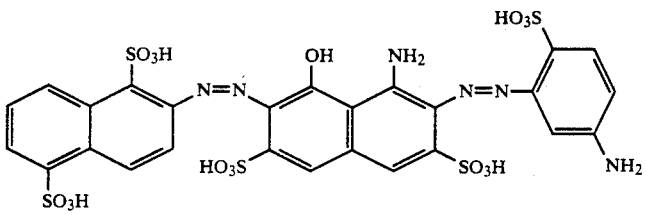

TABLE 2

| Example | —D | —D'—B—A | Hue |
|---|---|---|---|
| 82 | 2-SO₃H-phenyl | 4-(HO₃S)-phenyl-3-NH—A | navy (606 nm) |
| 83 | 4-(HO₃S)-phenyl | " | navy (608 nm) |
| 84 | 4-(H₂N—O₂S)-phenyl | " | navy (604 nm) |
| 85 | 2-CO₂H-phenyl | " | navy |
| 86 | 4-(HO₃SOCH₂CH₂—O₂S)-phenyl | 4-(HO₃S)-phenyl-3-NH—A | navy (602 nm) |

TABLE 2-continued

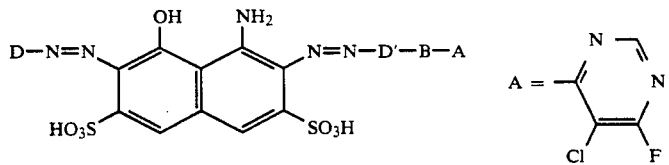

| Example | —D | —D'—B—A | Hue |
|---|---|---|---|
| 87 | 2-methyl-6-(2-sulfatoethylsulfonyl)naphthalene-1-sulfonic acid group | " | greenish navy |
| 88 | 3-methyl-6-methylbenzene-1-sulfonic acid group | " | navy |
| 89 | 2-(6-methylbenzothiazol-2-yl)-4-methylbenzene-3-sulfonic acid, 7-sulfonic acid group | " | greenish black |
| 90 | 4'-sulfo-2-methyl-5-(phenylazo)benzene-3-sulfonic acid group | 4-methyl-3-(A-amino)benzene-1-sulfonic acid group | greenish black |
| 91 | 3-methyl-6-sulfonaphthalene-2-sulfonic acid group | " | greenish navy |
| 92 | 3-methylnaphthalene-2,5,7-trisulfonic acid group | " | " |
| 93 | 3-(4-(2-sulfatoethylsulfonylmethyl)phenylazo)-2,6-dimethylbenzene-5-sulfonic acid group | " | black |
| 94 | 2-methylnaphthalene-1-sulfonic acid group | 2-methyl-5-(A-amino)-4-sulfobenzene-1-sulfonic acid group | navy |

TABLE 2-continued

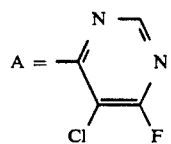

| Example | —D | —D′—B—A | Hue |
|---|---|---|---|
| 95 | 2-methylbenzenesulfonic acid (SO₃H ortho to attachment) | 4-methyl-2-sulfo-5-(NH—A)benzenesulfonic acid (HO₃S, SO₃H, NH—A substituents) | navy |
| 96 | 2-methylnaphthalene-1,5-disulfonic acid | 4-methyl-3-sulfo-aniline-NH—A | greenish blue |
| 97 | 2-methylbenzenesulfonic acid | ″ | ″ |
| 98 | 2-methylnaphthalene-1-sulfonic acid | 4-methyl-2-(NH—A)-5-sulfobenzenesulfonic acid | ″ |
| 99 | 2-methylbenzenesulfonic acid | ″ | ″ |
| 100 | 2-methylnaphthalene-1,5-disulfonic acid | 4-methyl-benzene with CH₂—N(CH₃)—A and SO₃H | navy |
| 101 | 2-methylbenzenesulfonic acid | ″ | ″ |
| 102 | 2,5-dimethyl-benzenesulfonic acid (CH₃, SO₃H) | ″ | ″ |

TABLE 2-continued

Structure: D—N=N— [naphthalene with OH, NH₂, two SO₃H groups] —N=N—D'—B—A

A = pyrimidine with Cl and F substituents (5-chloro-6-fluoropyrimidin-4-yl)

| Example | —D | —D'—B—A | Hue |
|---|---|---|---|
| 103 | 2-methyl-5-chlorobenzenesulfonic acid (SO₃H) | " | " |
| 104 | 2-methyl-6-(β-sulfatoethylsulfonyl)naphthalene-1-sulfonic acid (HO₃SOCH₂CH₂O₂S–, SO₃H) | " | greenish navy |
| 105 | 4-sulfophenyl–N=N–(2-methyl-4-sulfophenyl)– (HO₃S–C₆H₄–N=N–C₆H₃(SO₃H)(CH₃)–) | –C₆H₃(CH₃)(SO₃H)–CH₂–N(CH₃)–A | dark green |
| 106 | –C₆H₄–SO₂CH₂CH₂OSO₃H | –C₆H₄–SO₂CH₂CH₂–N(CH₃)–A | navy black |
| 107 | 2-methylbenzenesulfonic acid (SO₃H) | " | " |
| 108 | 2-methyl-1,4-benzenedisulfonic acid (SO₃H, HO₃S) | " | " |
| 109 | 2-methyl-1,5-naphthalenedisulfonic acid (SO₃H, SO₃H) | " | greenish navy |
| 110 | " | 2-methylphenyl–SO₂CH₂CH₂–NH–A | " |

TABLE 2-continued

Structure: D—N=N— on naphthalene with OH, NH₂, HO₃S, SO₃H, and —N=N—D'—B—A

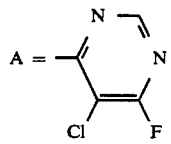

A = pyrimidine with Cl and F substituents

| Example | —D | —D'—B—A | Hue |
|---|---|---|---|
| 111 | 2-methyl-1,4-benzenedisulfonic acid (SO₃H, HO₃S on methylbenzene) | 2-methylphenyl-SO₂CH₂CH₂—NH—A | greenish navy |
| 112 | 2-methylnaphthalene-1,5-disulfonic acid | 7-methylnaphthalene-1-sulfonic acid with 3-SO₂—CH₂CH₂—N(CH₂CH₂SO₃H)—A | " |
| 113 | 2-methylbenzenesulfonic acid | " | " |
| 114 | " | 7-methylnaphthalene-1-sulfonic acid with 3-SO₂CH₂CH₂—N(CH₂—CO₂H)—A | " |
| 115 | 2-methylnaphthalene-1,5-disulfonic acid | 7-methylnaphthalene-1-sulfonic acid with 3-SO₂CH₂CH₂—N(CH₂—CO₂H)—A | greenish navy |
| 116 | " | 2-methylnaphthalene-1-sulfonic acid with 5-CH₂—NH—A | " |
| 117 | 2-methylbenzenesulfonic acid | " | " |
| 118 | 4-methoxy-2-methylbenzenesulfonic acid (CH₃O, SO₃H) | " | greenish black |

TABLE 2-continued

Structure:
D—N=N—[naphthalene with OH, NH₂, SO₃H, HO₃S]—N=N—D'—B—A $$A = \begin{array}{c} \text{pyrimidine ring with Cl and F substituents} \end{array}$$

| Example | —D | —D'—B—A | Hue |
|---------|----|---------|-----|
| 119 | HO₃S—C₆H₄—N=N—C₆H₃(SO₃H)(CH₃)— | naphthalene with SO₃H and CH₂NH—A | dark green |
| 120 | 2,5-disulfophenyl (SO₃H, HO₃S) | —C₆H₄—CH₂—N(CH₃)—A | navy |
| 121 | naphthalene with SO₃H (1,5) and CH₃ | —C₆H₄—NH—A | greenish black |
| 122 | phenyl with SO₃H and HO₃S | —C₆H₄—NH—A | greenish black |

EXAMPLES 123–164

Dyestuffs of these examples were obtained by using in Example 81 to 122 1-amino-8-hydroxy-4,6-naphthalenedisulphonic acid instead of the coupling component 1-amino-8-hydroxy-3,6-naphthalenedisulphonic acid. The hues of Examples 123 to 164 are all somewhat more reddish on cotton than the analogous dyestuffs 81 to 122, such as, for example, Example 123

EXAMPLE 123

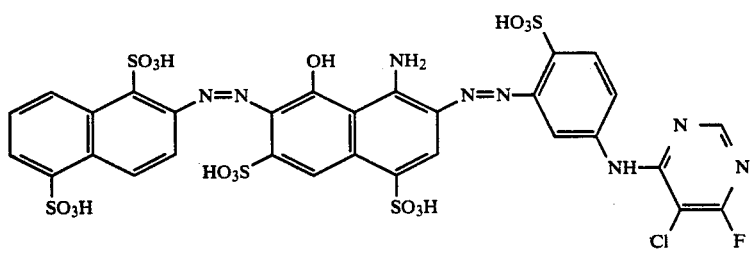

(a little more reddish than Example 81).

We claim:

1. A dyestuff of the formula

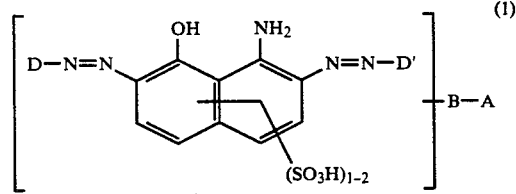

in which

A represents the radical of the formula

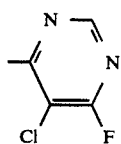

B represents a bridging member, in which the grouping —B—A is linked to a carbon atom of an aromatic ring system in D or D′, and D and D′ represents the radical of a diazo component from the benzene or naphthalene series, with the exception of the dyestuff of the formula

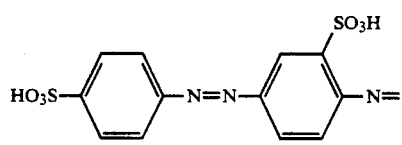
(2)

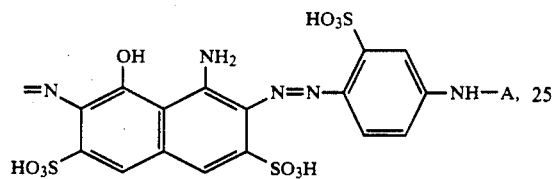

2. A dyestuff according to claim 1, in which
B represents —(CH$_2$)$_{0-1}$—NR— or —SO$_2$—CH$_2$CH$_2$—NR—, in which the bonding to A is in each case via the nitrogen atom, and
R represents hydrogen or unsubstituted or hydroxyl-, chlorine, carboxyl-, sulpho- or sulphato-substituted C$_1$-C$_4$-alkyl.

3. A dyestuff of the formula

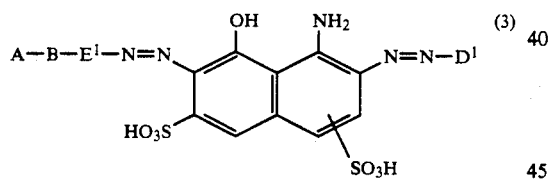
(3)

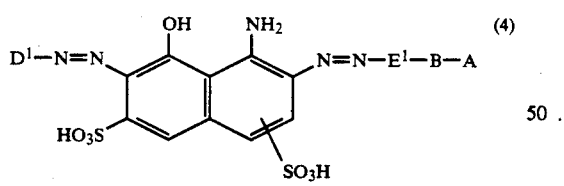
(4)

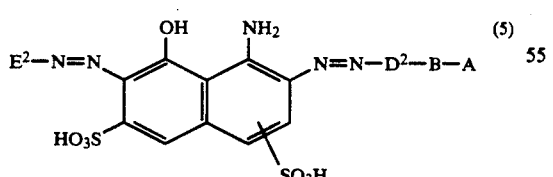
(5)

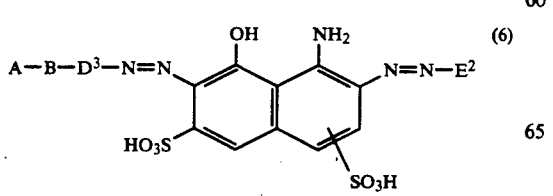
(6)

in which
—B—E$^1$— represents

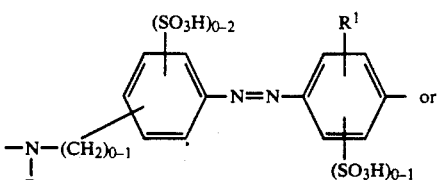 or

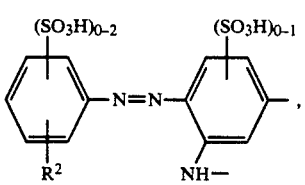,

D$^1$ represents

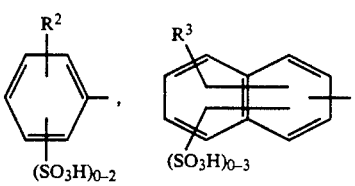,

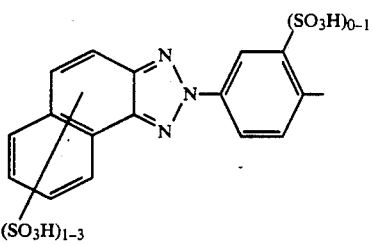 or

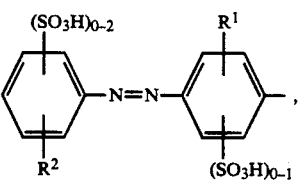

E$^2$ represents

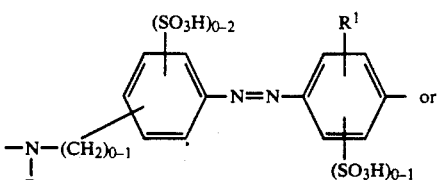,

—B—D$^2$— represents

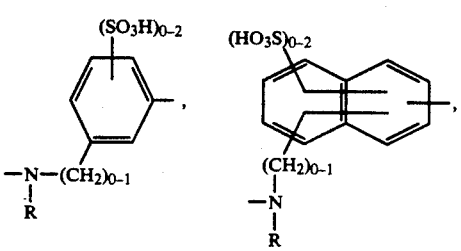,

-continued

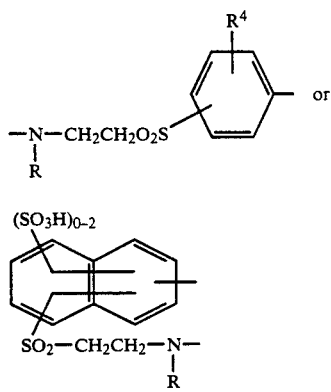

and —B—D³— represents
—B—D²— or

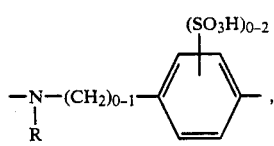

in which
R¹ represents H, CH₃, —C₂H₅, —OCH₃, —OC₂H₅, Cl, Br, —NHCOCH₃ or —NHCONH₂,
R² represents H, CH₃, —C₂H₅, —OCH₃, —OC₂H₅, Cl, Br, —CO₂H, —NHCOCH₃, —SO₂CH=CH₂, —SO₂CH₂CH₂OSO₃H or —SO₂CH₂CH₂Cl,
R³ represents H, Cl, —OCH₃, —OC₂H₅, —SO₂CH=CH₂, —CO₂H, —SO₂CH₂CH₂Cl or —SO₂CH₂CH₂OSO₃H and
R⁴ represents H, CH₃, Cl, Br, —COOH, —SO₃H or —OCH₃,
and
R represents hydrogen or unsubstituted or hydroxyl-, chlorine-, carboxyl-, sulpho- or sulphato-substituted C₁₋₄-alkyl, and
A represents the radical of the formula

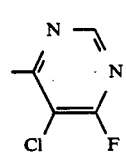

4. A dyestuff of the formulae

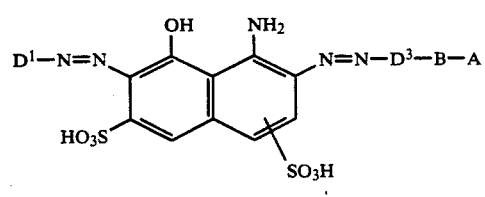

and

-continued

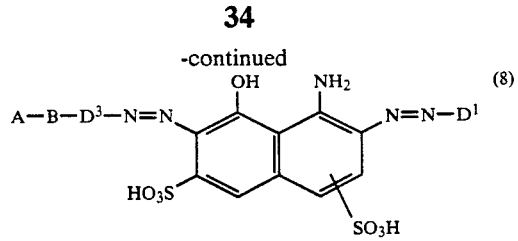

in which
A represents the radical of the formula

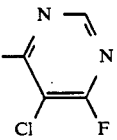

—B—D³— represents

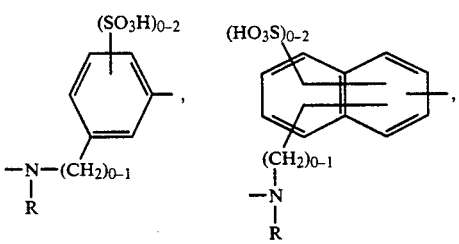

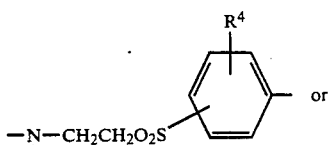

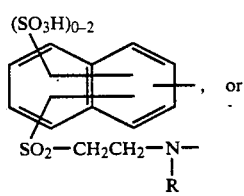

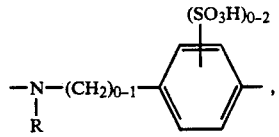

R represents hydrogen or unsubstituted or hydroxyl-, chlorine-, carboxyl-, sulpho- or sulphato-substituted C₁₋₄-alkyl,
R⁴ represents H, CH₃, Cl, Br, —COOH, —SO₃H, or —OCH₃, and
D¹ represents

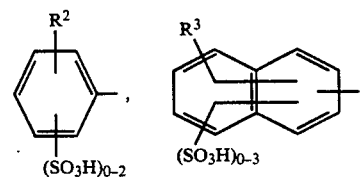

-continued

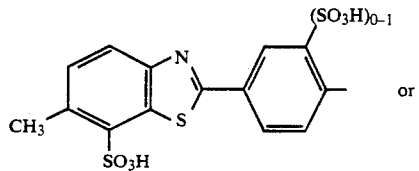  or

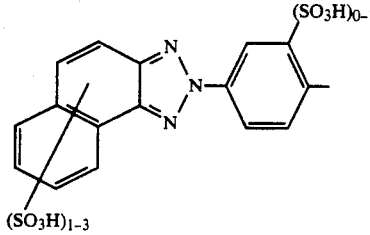

R² represents H, CH₃, —C₂H₅, —OCH₃, —OC₂H₅, Cl, Br, —CO₂H, —NHCOCH₃, —SO₂CH=CH₂, —SO₂CH₂CH₂OSO₃H or —SO₂CH₂CH₂Cl, and R³ represents H, Cl, —OCH₃, —OC₂H₅, —SO₂CH=CH₂, —CO₂H, —SO₂CH₂CH₂Cl or —SO₂CH₂CH₂OSO₃H.

5. A dyestuff of claim 1 of the formulae

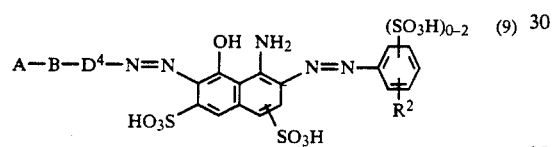 (9)

in which
B—D⁴— represents

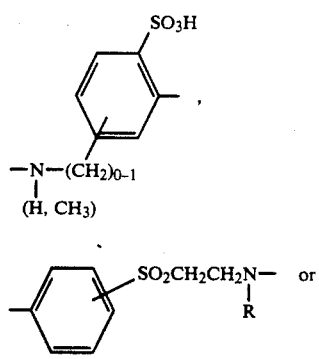

-continued

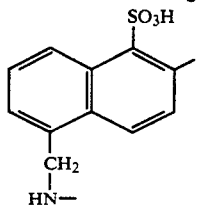

wherein
R represents hydrogen or unsubstituted or hydroxyl-, chlorine-, carboxyl-, sulpho- or sulphato-substituted C₁₋₄-alkyl.

6. A dyestuff of claim 1 of the formulae

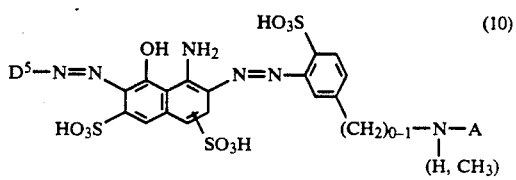 (10)

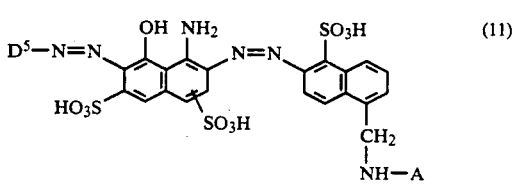 (11)

in which
D⁵ represents wherein

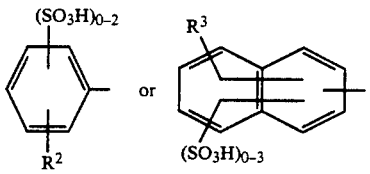

R² represents H, CH₃, —C₂H₅, —OCH₃, —OC₂H₅, Cl, Br, —CO₂H, —NHCOCH₃, —SO₂CH=CH₂, —SO₂CH₂CH₂OSO₃H or —SO₂CH₂CH₂Cl, and R³ represents H, Cl, —OCH₃, —OC₂H₅, —SO₂CH=CH₂, —CO₂H, —SO₂CH₂CH₂Cl or —SO₂CH₂CH₂OSO₃H.

7. Process for the dyeing or printing of hydroxyl- or amido-containing materials with a dyestuff wherein a dyestuff according to claim 1 is used.

* * * * *

UNITED STATES PATENT AND TRADEMARK OFFICE
CERTIFICATE OF CORRECTION

PATENT NO. : 5,166,325
DATED : November 24, 1992
INVENTOR(S) : Herd et al.

It is certified that error appears in the above-identified patent and that said Letters Patent is hereby corrected as shown below:

Title page, Item (56): U.S. PATENT DOCUMENTS: After " 4,996,304, 2/1991 " delete " Trikas " and substitute --Tzikas--

Col. 36, line 34   Delete " wherein "

Col. 36, line 43   Insert -- wherein --

Signed and Sealed this

Seventh Day of June, 1994

Attest:

BRUCE LEHMAN

Attesting Officer            Commissioner of Patents and Trademarks